Aug. 29, 1961     E. S. RUSSEY ET AL     2,997,996
CONTROL DEVICE FOR ENGINE STARTING CIRCUIT
Filed Sept. 14, 1959     4 Sheets-Sheet 1
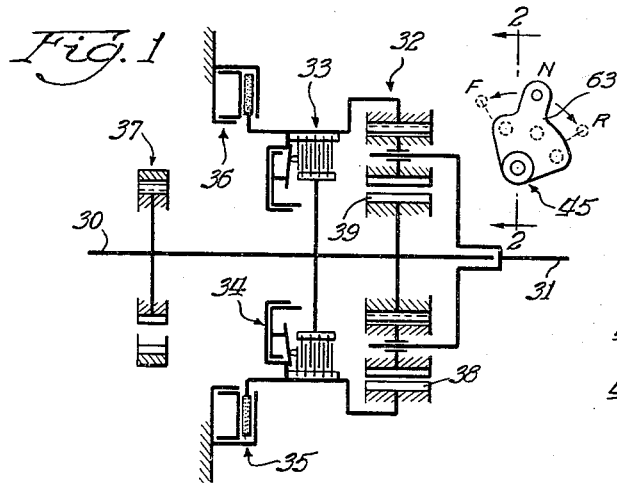
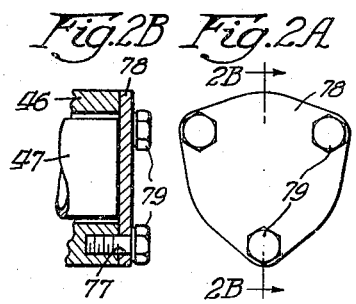
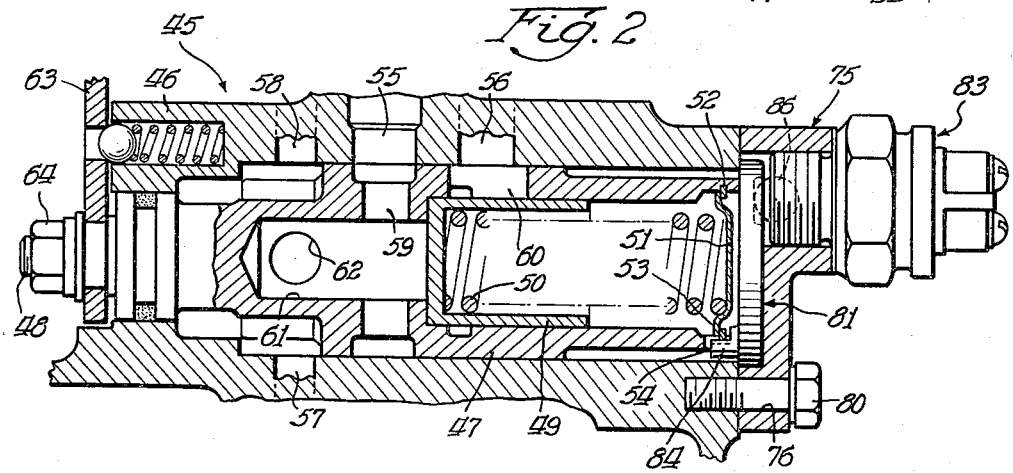
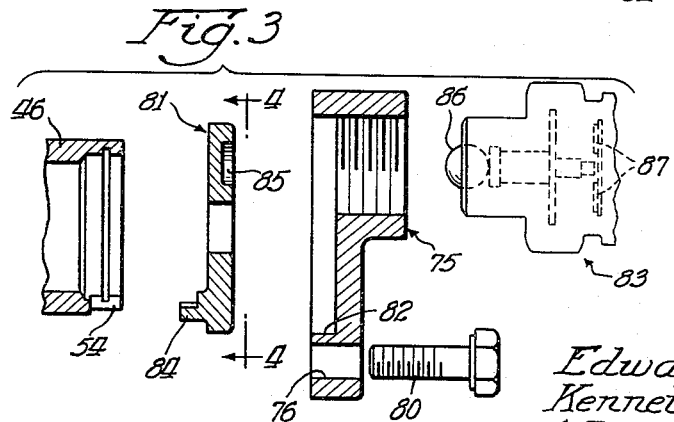
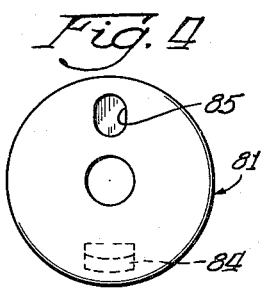
Inventors:
Edward S. Russey
Kenneth M. Armantrout
and Donald W. Kelbel
By: Ray E. Snyder
Atty.

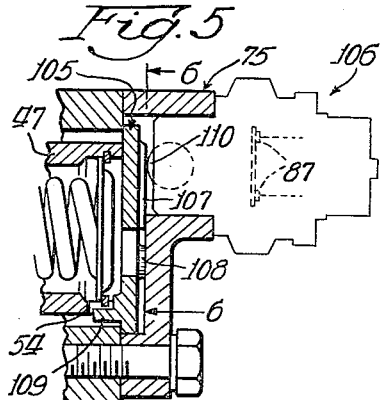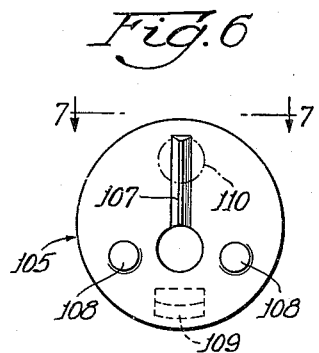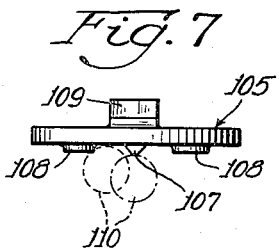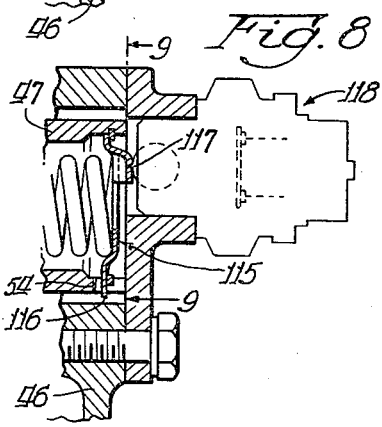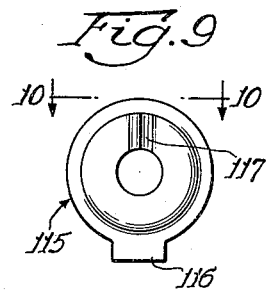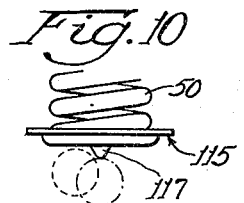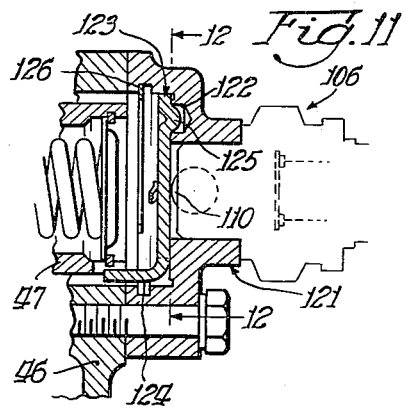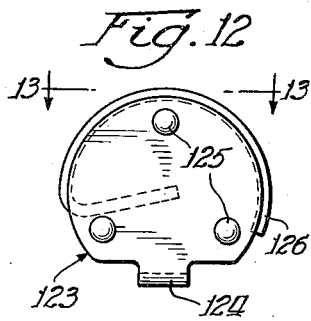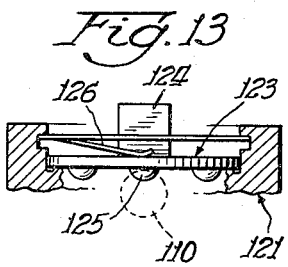

Aug. 29, 1961  E. S. RUSSEY ET AL  2,997,996
CONTROL DEVICE FOR ENGINE STARTING CIRCUIT
Filed Sept. 14, 1959  4 Sheets-Sheet 3
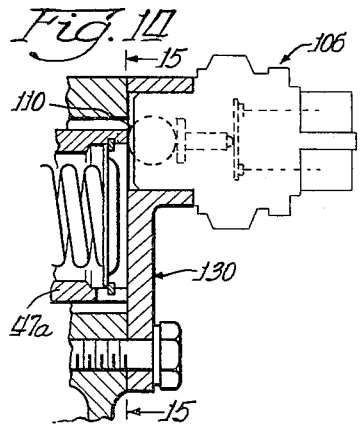
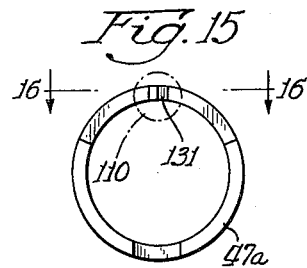
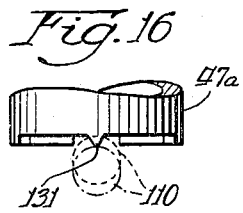
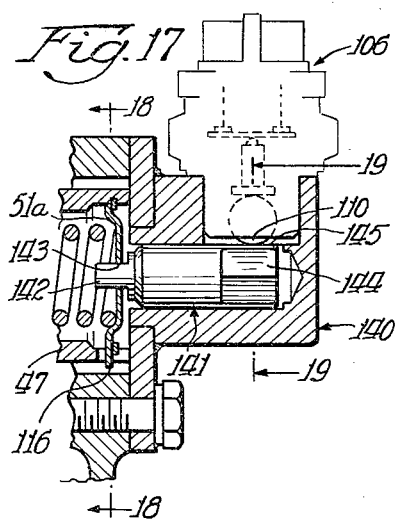
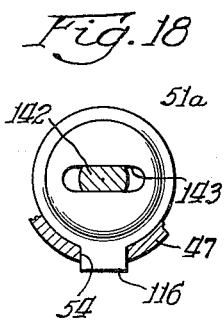
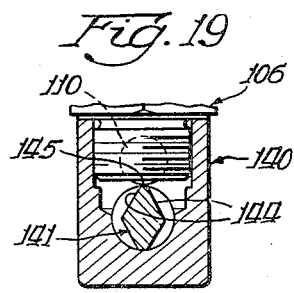
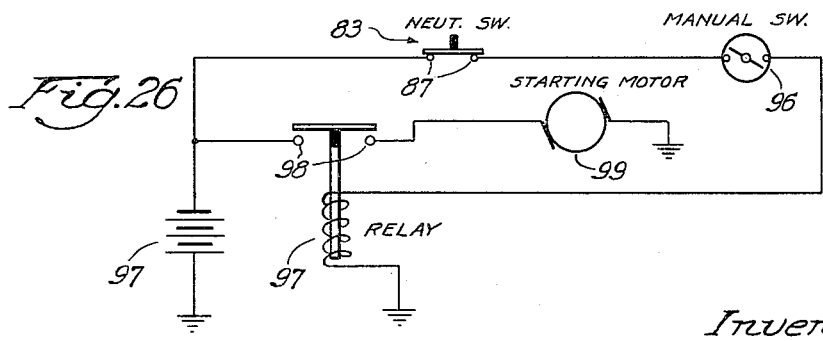
Inventors:
Edward S. Russey
Kenneth M. Armantrout
and Donald W. Kelbel
By: Ray E. Snyder
Atty.

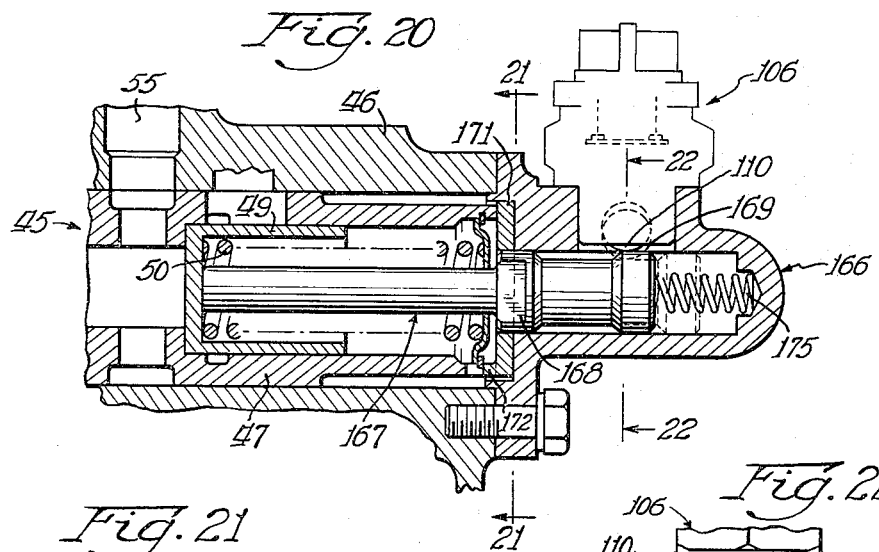
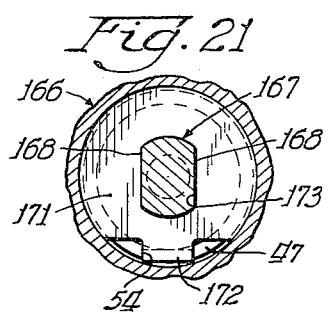
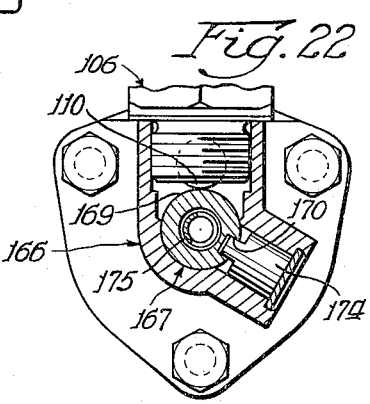
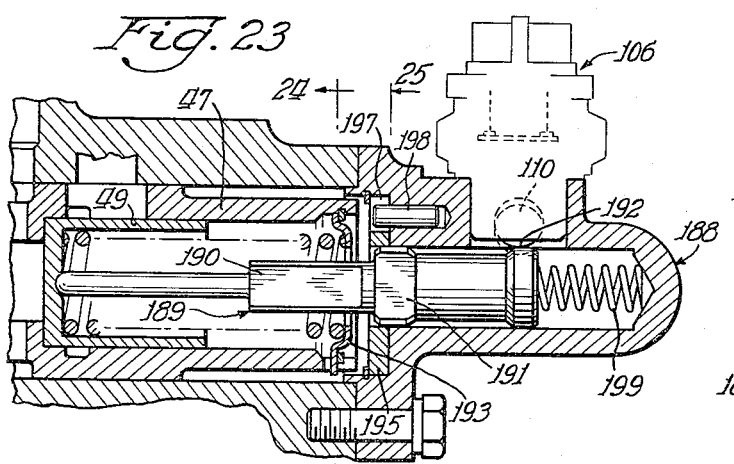
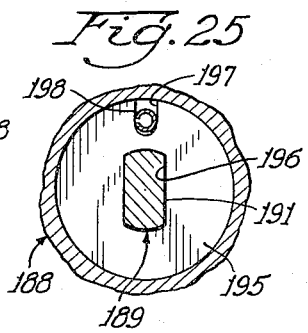
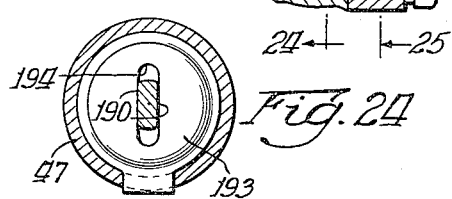

United States Patent Office 2,997,996
Patented Aug. 29, 1961

2,997,996
CONTROL DEVICE FOR ENGINE STARTING CIRCUIT
Edward S. Russey, Kenneth M. Armantrout, and Donald W. Kelbel, Muncie, Ind., assignors to Borg-Warner Corporation, Chicago, Ill., a corporation of Illinois
Filed Sept. 14, 1959, Ser. No. 839,874
12 Claims. (Cl. 123—179)

This invention relates to a device for controlling the electric starting circuit of an engine and, more particularly, to a device for preventing starting of an engine which is coupled to a transmission when the transmission is in a drive condition.

In providing transmissions for various purposes, there has quite often been no arrangement whereby the driving engine coupled to the transmission is prevented from being started when the transmission is in gear. The importance of such a start preventing arrangement is clearly shown with regard to marine installations which, in many past instances, have been void of any such arrangement. Inasmuch as the starting load would be much less in a propeller driven craft than in a land vehicle, the driving engine of a propeller driven craft, therefore, could be more readily started with the transmission in gear, and the craft would be immediately moved against the dock or other adjacent structure. It is therefore extremely important to be able to adapt such an engine and transmission drive to automatically prevent starting of the engine, when the transmission is in gear.

It is a primary object of the present invention to provide an improved device of simple and economic construction for automatically disabling the starting circuit of an engine when the transmission, connected to the engine, is in gear.

More particularly, it is an object of the present invention to provide an engine disabling device readily attachable to existing transmissions.

Another object of this invention is to provide an engine start preventing device responsive to movements of a transmission shifting linkage to preclude engine starting when the transmission is in gear.

Still another object of this invention is to provide an interlocking device between the transmission shifting linkage and the engine starting circuit to prevent a starting of the engine until the transmission is returned to neutral condition.

FIG. 1 is a schematic representation of a transmission mechanism showing a gear arrangement and shifting link therefor;

FIG. 2 is an enlarged partial sectional view taken along line 2—2 of FIG. 1 showing a rotary selector valve with an embodiment of applicants' invention attached thereto;

FIG. 2A is a partial end view on a smaller scale of a rotary selector valve showing an existing end plate prior to its being replaced by applicants' controlling device;

FIG. 2B is a partial sectional view taken along line 2B—2B of FIG. 2A, showing the rotary selector valve and end cover plate therefor prior to its being replaced by applicants' controlling device;

FIG. 3 is an exploded partial sectional view of a preferred embodiment of the invention, including an actuating cam;

FIG. 4 is a view taken along line 4—4 of FIG. 3 showing the reaction surface of the actuating cam;

FIG. 5 is a partial sectional view showing the rotary selector valve with another embodiment of the invention attached thereto;

FIG. 6 is a view taken along line 6—6 of FIG. 5 showing the reaction surface of an actuating cam illustrated in FIG. 5;

FIG. 7 is a view taken along line 7—7 of FIG. 6 showing the cooperation between the actuating cam and a switch actuator;

FIG. 8 is a partial sectional view of the rotary selector valve with another embodiment of the invention attached thereto;

FIG. 9 is a view taken along line 9—9 of FIG. 8 showing the reaction surface of an actuating cam illustrated in FIG. 8;

FIG. 10 is a view taken along line 10—10 of FIG. 9 showing the cooperation between the actuating cam and a switch actuator;

FIG. 11 is a partial sectional view of the rotary selector valve with another embodiment of the invention attached thereto;

FIG. 12 is a view taken along line 12—12 of FIG. 11 showing the reaction surface of an actuating cam;

FIG. 13 is a partial sectional view taken along line 13—13 of FIG. 12 showing the cooperation between an actuating cam and a switch actuator;

FIG. 14 is a partial sectional view of the rotary selector valve with another embodiment of the invention attached thereto;

FIG. 15 is a view taken along line 15—15 of FIG. 14 showing the reaction surface of an actuator cam;

FIG. 16 is a view taken along line 16—16 of FIG. 15 showing the cooperation between the cam and a switch actuator;

FIG. 17 is a partial sectional view of the rotary selector valve showing another embodiment of the invention attached thereto;

FIG. 18 is a partial sectional view taken along line 18—18 of FIG. 17 showing a driving connection between the rotary selector valve core and a portion of the invention shown in FIG. 17;

FIG. 19 is a partial sectional view taken along line 19—19 of FIG. 17 showing the cooperation between the cam and a switch actuator;

FIG. 20 is a partial sectional view of the rotary selector valve with another embodiment of the invention attached thereto;

FIG. 21 is a partial sectional view taken along line 21—21 of FIG. 20 showing a driving interconnection between a rotary selector valve core and a switch actuator;

FIG. 22 is a partial sectional view taken along line 22—22 of FIG. 20 showing the cooperation between a cam and the switch actuator;

FIG. 23 is a partial section view of the rotary selector valve with another embodiment of the invention attached thereto;

FIG. 24 is a partial sectional view taken along line 24—24 of FIG. 23 showing a driving interconnection between the rotary selector valve core and a switch actuator;

FIG. 25 is a partial sectional view taken along line 25—25 of FIG. 23 showing a positive locking element between a valve core and a switch actuator; and FIG. 26 is a schematic illustration of a typical ignition engine starting circuit with the invention represented therein.

Like characters of reference designate like parts in the several views.

Referring to the drawings, a transmission mechanism is illustrated (FIG. 1) which is driven by an input shaft 30 connected to an engine (not shown) and which is adapted to drive a propeller or output shaft 31. The transmission includes a duplex planetary gear set 32, a multiple plate direct drive clutch 33, a servomotor 34 for operating the clutch 33, a reverse drive brake 35, a servomotor 36 for operating the brake 35, and a fluid pump 37 for supplying fluid under pressure to actuate the servomotors 34 and 36, all of which are enclosed within a casing (not shown).

The servomotor 34 actuates the clutch 33 to lock the planetary gear set 32 and the drive and driven shafts 30 and 31 together. This provides a direct drive from the drive shaft 30 to the driven shaft 31. The servomotor 36 operates the brake 35 to hold a ring gear 38 stationary. This provides a reaction member which renders effective a reverse drive from the drive shaft 30 to a sun gear 39 through the duplex planetary gear set 32 to the driven shaft 31. When neither the brake 35 nor the clutch 33 is operated, the drive shaft 30 and the driven shaft 31 will not in any way be drivingly interconnected and the transmission will thereby be in neutral.

In FIG. 2, there is illustrated a rotary selector valve 45 for selectively applying fluid under pressure, as provided by the pump 37, to the clutch or brake servomotors 34 and 36. The rotary selector valve 45 comprises a casing 46, a core 47 rotatably mounted in the casing 46 a shaft 48 extending longitudinally from the core 47, a pressure relief valve piston 49, a spring 50 within the piston 49, and a retaining cap 51 held within the valve core 47 by a retaining snap ring 52. The valve core 47 is formed with a longitudinal slot 54.

The valve casing 46 has an inlet port 55, an outlet or bypass port 56, a forward port 57 and a reverse port 58. The valve core 47 has a receiving port 59 and a bypass port 60 alternately registerable with the casing inlet port 55 and the casing outlet by-pass port 56, respectively, by oscillating the valve core 47 within the valve casing 46. An axial passage 61 interconnects the valve core inlet port 59 with a valving port 62. The valving port 62 is either blocked by the valve casing 46 (FIG. 2) or is in registry with the forward or reverse ports 57 and 58, depending on where the core 47 is radially positioned in the casing 46. At all times, when fluid is being pumped through the system, the pressure relief piston is moved to the right (FIG. 2) against the force of the spring 50, to regulate the pressure in the system by dumping the excess fluid through the by-pass parts 60 and 56.

A lever arm 63 (FIGS. 1 and 2) is secured to the valve core 47 by a nut 64 on a threaded end portion of the core shaft 48. The lever arm 63 provides a means for rotating the valve core 47 to selectively place the desired ports of the core 47 in registry with respective ports of the casing 46. The lever arm 63 and valve core 47, rigidly connected thereto, are retained in one of three positions (FIG. 1) namely, F-forward, N-neutral, and R-reverse by detent (FIG. 2) to selectively provide three channels through the valve 45 for the fluid supplied thereto under pressure by the pump 37.

When the lever arm 63 (FIGS. 1 and 2) is rotated to the N or neutral position (FIG. 1) the valve core 47 will be positioned as shown in FIG. 2. With the valve core 47 in this position, fluid under pressure supplied by pump 37 enters through inlet port 55, in the valve casing 46, passes through the receiving port 59, in the valve core 47, and into the axial passage 61. The valving port 62 (FIG. 2) is blocked by the valve casing 46. Therefore, the fluid entering the axial passage 61 moved the relief piston 49 to the right and the fluid flows through the by-passed port 60 of the valve core 47 and is returned to a sump (not shown) through outlet bypass port 56 in the valve casing 46. Thus, it is provided that in the N position the fluid from the pump 37 is merely recirculated and has no effect on the transmission which results in a neutral condition therein.

When the lever arm 63 is rotated to the F or forward position (FIG. 1), fluid passes from the valving port 62 of the valve core 47 through the forward port 57 in the valve casing 46 and on to the servomotor 34 (FIG. 1) to provide a forward drive condition in the transmission, as previously described.

Similarly, when the lever arm 63 is positioned in the R or reverse position, the valving port 62 is connected with the reverse port 58, to allow the fluid to actuate the servomotor 36 and provide a reverse drive condition in the transmission, as previously described.

A preferred embodiment of applicants' invention (FIGS. 2, 3 and 4) includes a housing 75 which has three holes 76 therein arranged in a pattern identical with those of a set of holes 77 in an end plant 78 (FIGS. 2A and 2B). This end plate 78 is a standard piece used for covering the end of the rotary selector valve 45. It should be noted that the standard end plate 78 and the housing 75 are readily interchangeable by merely removing a set of screws 79 and replacing the plate 78 with the housing 75 and a longer set of screws 80.

The embodiment of the invention illustrated in FIGS. 2 and 3 also includes a cam member 81 rotatably mounted in a recess 82, in the housing 75, adjacent a normally closed switch 83 threadably mounted in the housing 75. The cam 81 has a prong 84 (FIGS. 3 and 4) fitted into the slot 54 (FIGS. 2 and 3) of the valve core 47 adjacent the prong 53 of the retaining cap 51. The cam member 81 will thereby be rotated with the valve core in response to the movement of the lever arm 63. A recess 85 is provided in the cam 81 and the switch 83 has a spring biased actuator 86 which is positioned to enter the recess 85 when the cam member 81 is positioned as indicated in FIG. 2. When the actuator 86 enters the recess, a set of normally closed contacts 87 connected thereto will be closed to complete a starting circuit (FIG. 26). It is important to note that only in the neutral position (FIGS. 1 and 2) will the contacts 87 be closed to complete the starting circuit.

The starting circuit (FIG. 26) is typical and comprises a power supply 95, a manual starting switch 96 and a relay 97 in series. Applicants' invention (FIG. 3) is shown diagrammatically (FIG. 26) in series with the manual starting switch. When the normally closed switch 83 is closed by positioning the recess 85 (FIG. 2) of the cam 81 adjacent the spring biased switch actuator 86, a current will be available through the switch 83 and the manual switch 96 to energize relay 97 (FIG. 26). When the manual switch 96 is closed, with the switch 83 normally closed, the relay 97 will be energized which will in turn close contacts 98 to complete a circuit from the power supply 95 through the contacts 98 and through the starting motor 99 to actuate the starting motor 99. It should be noted that the circuit for actuating the relay 97 and hence the starting motor 99, is inoperative as long as the normally closed switch 83 is held open by the cam 81 and that this will always occur except when the valve 45 is in neutral position.

Another embodiment of applicants' invention is illustrated in FIGS. 5, 6 and 7 and includes a cam member 105 rotatably mounted in the housing 75 and a normally open switch 106, threaded into the housing 75. The cam member 105 has cam surface 107, bosses 108 and a prong 109. The bosses 108, merely providing sliding surfaces to maintain the cam member 105 perpendicular to the valve core 47. The prong 109 fits into the slot 54, of the valve core 47 to key the cam member 105 to the valve core 47.

Upon rotation of the valve core 47, to neutral position, a spring biased switch actuator 110 which is connected to contacts 87 of the normally open switch 106, will ride up on the cam surface 107 and close the normally open switch 106 to render the starting circuit (FIG. 26) operative. In either of the two other positions, forward and reverse, the spring biased switch actuator 110 will be moved to the left (FIG. 5) against the cam member 105, off of the raised surface 107, to allow the contacts 87 of the normally open switch 106 to open and thereby disable the starting circuit (FIG. 26). It should be noted that the starting circuit is therefore only operable when the lever arm is in the neutral position with the raised portion 107 in contact with the switch actuator 110.

Another embodiment of applicants' invention is illustrated in FIGS. 8, 9 and 10, and includes a combination retaining cap and cam in a single member 115. The member 115 has a prong 116 to key it to the valve core 47 and a cam surface 117 to actuate a normally open switch 118 when the valve core 47 is in neutral position. The starting circuit (FIG. 26) is thereby disabled in every position except the one shown in FIGS. 8, 9 and 10 which is in the neutral position.

Another embodiment of applicants' invention is illustrated in FIGS. 11, 12 and 13 and includes a housing 121 having a recess 122, the normally open switch 106 and actuator 110, a cam member 123 having a prong 124 to key the cam member 123 to the valve core 47, and three raised portions 125. The cam member 123 is held to the right (FIG. 11) against the actuator 110 by a leaf spring 126 mounted in the housing 121. The cam member will be slightly rotated counter-clockwise (FIG. 11) as the valve core 47 is rotated in the casing 46 until the neutral position is reached. Whereupon, the raised portion 125 (FIG. 11) will enter the recess 122 and move the actuator 110 to the right to close the normally open switch 106 and thereby present the only conditions under which the starting circuit (FIG. 26) can be made operable.

Another embodiment of applicants' invention is illustrated in FIGS. 14, 15 and 16 which includes a housing 130 and normally open switch 106, with the spring biased actuator 110. The switch 106 is threaded into the housing 130 and a special valve core 47a having a cam surface 131 thereon is used. By rotating the valve core 47a to the position shown in FIG. 14, which is the neutral position, the spring biased actuator 110 will close the normally open contacts of normally open switch 106, thereby providing the only position rendering the starting circuit (FIG. 26) operable. That position being the neutral position.

Another embodiment of applicants' invention is illustrated in FIGS. 17, 18 and 19 and includes a housing 140, a cam member 141, and a normally open switch 106 with the actuator 110. The cam member 141 has a prong 142 inserted in a slot 143 in the retaining cap 51a which is keyed to valve core 47 by prong 116 in slot 54. The cam 141 also has cam flat surfaces 144 adjacent the actuator. A cam surface 145 provides a surface to move the actuator 110 against the spring bias thereof to close the normally open contacts of the normally open switch 106 when the valve core 47 is rotated to neutral position. Thereby, the starting circuit (FIG. 26) is rendered operable in only the neutral position.

Another embodiment of applicants' invention is illustrated in FIGS. 20, 21 and 22 and includes, among other things, a housing 166, a normally open switch 106, a switch actuator 110, and a plunger 167 slideably mounted in the housing 166. The plunger 167 has a pair of flat surfaces 168, a raised cam surface 169 and a key way 170 (FIG. 22). This embodiment of the invention also includes a valve core and plunger interlocking plate 171, having a prong 172 insertable in the slot 54 of the valve core 47, to key the plate 171 to the valve core 47. An aperture 173 is provided in the plate 171 to slidably receive the flat surfaces on the plunger 167. A key 174 is mounted in the housing 166 and in the key way 170, to key the plunger 167 against rotation within the housing 166 but allowing longitudinal movement of the plunger 167 in the housing 166. A spring 175 is mounted within the housing 166 to bias the plunger 167 to the left (FIG. 20).

In operation this embodiment of applicants' invention, disables the transmission starting circuit (FIG. 26) except when the valve core 47 of the valve 45 is in neutral position. In neutral position, with the engine stopped, the fluid pressure will be at a minimum, and the relief piston 49 will be in the left-most position (FIG. 26). The flats 168 on the plunger 167 will be positioned within the aperture 173 of the plate 171 and the cam surface 169 will be positioned beneath the spring biased switch actuator 110 of the switch 106. The switch 106 will thereby be closed, making the starting circuit (FIG. 26) operable. It will be noted, that in this position, the valve core 47 cannot be rotated from the neutral position inasmuch as the plunger 167 is keyed by the key 174 against rotation, and the plate, which is keyed to the valve core 47, engages the flats 168 and is thereby held against rotation to any other position. When the plunger 167 is in the left-most position to render the starting circuit (FIG. 26) operable, it is impossible to rotate the valve core 47 to place the transmission in a drive condition.

After the engine has been started, the pressure in the hydraulic system will increase and move the piston relief valve 49 to the right (FIG. 20) to regulate the system at a predetermined pressure. The movement of the piston relief valve 49 to the right, will cause the plunger 167 to move to the right an remove the flats 168 from within the aperture 173 in the plate 171 and thereby release the valve core 47. The valve core 47 can thereupon be rotated to place the transmission in a drive condition. In this position, the cam surface is removed from beneath the switch 106, thereby allowing the switch 106 to open and incapacitate the starting circuit (FIG. 26). The starting circuit therefor will not again be operable until flats 168 on the plunger 167 are aligned with the aperture 173 in the plate 171. When the alignment occurs, the plunger 167 is permitted to return to the left or neutral position, under the force of the spring 175 to bring the cam surface 169 beneath the switch 106 and move the switch actuator 110 to close the contacts thereof.

A somewhat similar embodiment of applicants' invention is disclosed in FIGS. 23, 24 and 25, and includes a housing 188, normally open switch 106 laterally mounted in the housing 188 and, switch actuator 110, an interlocking plunger 189 having flat surfaces 190 and 191, and a cam surface 192. A retaining cap 193 is keyed to the valve core 47 in the slot 54 and has an aperture 194 which fits slideably over the plunger flats 190 (FIG. 24). An interlocking plate 195 having an aperture 196 to slideably receive the flats 191 of the interlocking plunger 189 has a slot 197 to receive a pin 198 rigidly mounted in the housing 188. A spring 199 tends to move the plunger 189 to the left (FIG. 23).

In operation, to start the engine, the valve core 47 must be rotated to a neutral position, to allow the spring 199 to move the plunger 189 to the left (FIG. 23) to force the flats 191 into the aperture 196 of the interlocking plate 193 (FIGS. 23 and 25) and thereby moving the cam surface 192 beneath the switch 106 to move the switch actuator to close the switch 106 and thereby render the starting circuit (FIG. 26) operable. After the engine is started, the pressure in the hydraulic system will increase and the piston relief valve 49 will move to the right (FIG. 23) to regulate the pressure and move the plunger 189 to disengage the flats 191 from the interlocking plate 195 and to remove the cam surface 192 from beneath the switch 106, and thereby allowing the plunger 189 to rotate free of the interlocking plate 195 and to open the contacts of the switch 106.

In this condition, the valve core 47 and the plunger 189 are unlocked from the rigidly held interlocking plate 195 and are thereby free to rotate to place the valve core 47 in a drive position. If the engine should stop while the device is in this condition, the plunger 189 would be blocked from moving back within the interlocking plate 195 under the action of the spring, inasmuch as the flats 191 on the plunger 189 (FIGS. 23 and 25) would not be aligned with the apertures 196 in the interlocking plate 195. Thereby, the valve core 47 would have to be rotated to the neutral position to align the 25) would not be aligned with the aperture 196 in the interlocking plate 195. This alignment would allow the spring 199 to move the plunger 189 to the left, to bring the cam surface 192 beneath the switch 106 and to close the contacts of the switch 106 for returning the starting circuit (FIG. 26) to operable condition. It should be noted that it is thereby impossible to start or restart the transmission before the valve core is returned to neutral position.

While the invention has been described in connection with specific embodiments thereof, it is to be understood that this is by way of illustration and not by way of limitation and the scope of the invention is defined solely by the appended claims which should be construed as broadly as the prior art will permit.

It is to be understood that our invention is not to be limited to the specific constructions and arrangements shown and described, except only insofar as the claims may be so limited, as it will be understood to those skilled in the art that changes may be made without departing from the principles of the invention.

We claim:

1. In a switch device for use with a transmission having a neutral and a drive condition and which is coupled to a power means, comprising a hydraulic system for conditioning said transmission to drive condition, a valve for controlling said hydraulic system, a power means drivingly coupled to said transmission, means for starting said power means, and means responsive to movement of said valve for preventing operation of said starting means when said transmission is in drive condition.

2. In a switch device for use with a transmission having a neutral and a drive condition and which is coupled to a power means, comprising a hydraulic system for conditioning the transmission to drive condition, a rotary valve for controlling said hydraulic system to select the drive condition, a power means drivingly coupled to said transmission, a means for starting said power means, and means responsive to movement of said valve for preventing operation of said starting means when said transmission is in drive condition.

3. In a switch device for use with a transmission having a neutral and a drive condition and which is coupled to a power means, comprising a hydraulic system for conditioning the transmission to drive condition, a rotary valve for controlling said hydraulic system to select the drive condition, a cam mounted on said rotary valve to rotate with said valve, a power means drivingly coupled to said transmission, an electric starting means for starting said power means, and a switch mechanism actuated by said cam to prevent operation of said power starting of said power means when said valve is positioned to cause the transmission to be in drive condition.

4. In a switch device for use with an engine which is drivingly connected with a hydraulically shifted transmission having a rotary valve with a rotatable valve core for controlling the hydraulic system to selectively provide a drive or neutral condition in the transmission, comprising an electric starting means for starting the engine, a housing rigidly mounted to the rotary valve, a cam rotatably mounted in said housing, said cam being keyed to said valve core to rotate with said valve core, and a switch mounted in said housing responsive to said cam to render the engine starting means operable only when said valve core is positioned in neutral position.

5. In a switch device for use with an engine which is drivingly connected with a hydraulically shifted transmission having a rotary valve with a rotatable valve core for controlling the hydraulic system to selectively provide a drive or neutral condition in the transmission, comprising an electric starting means for starting the engine, a housing rigidly mounted to the rotary valve and adjacent to the valve core, a cam mounted within the valve core, said cam being keyed to rotate with said valve core, and a switch mounted in said housing responsive to said cam to render the engine starting means operable only when said valve core is positioned in neutral position.

6. In a switch device for use with an engine which is drivingly connected with a hydraulically shifted transmission having a rotary valve with a rotatable core for controlling the hydraulic system to selectively provide a drive or neutral condition in the transmission, comprising an electric starting means for starting the engine, a housing rigidly mounted to the rotary valve, a cam rotatably mounted in said housing, said cam being keyed to said valve core to rotate with said valve core and having a camming surface on an outer radial face thereof, and a normally closed switch mounted in said housing responsive to said camming surface for rendering the engine starting means operative only when said valve is positioned in neutral position.

7. In a switch device for use with an engine which is drivingly connected with a hydraulically shifted transmission having a rotary valve with a rotatable valve core for controlling the hydraulic system for selectively providing a drive or neutral condition in the transmission, comprising an electric starting means for starting the engine, a housing rigidly mounted to the rotary valve, said housing having an internal recess therein, a cam rotatably mounted in said housing keyed to the rotary valve, said cam having a projection insertable in the recess in said housing, spring means mounted in said housing to force the projection into the recess in said housing when the projection and recess are aligned by the rotation of the valve core, and a switch mounted in said housing responsive to movement of said cam when said projection enters the recess in said housing for rendering the engine starting means operable.

8. In a switch device for use with an engine which is drivingly connected with a hydraulically shifted transmission having a rotary valve, comprising an electric starting means for starting the engine, a housing rigidly mounted to the rotary valve, an actuating valve core rotatably mounted in the rotary valve for controlling the hydraulic system to selectively provide a drive or neutral condition in the transmission, said actuating valve core having a cam surface thereon, a switch mounted in said housing responsive to the cam surfaces on said actuating valve core to render the engine starting means operable only when said actuating valve core is in neutral position.

9. In an interlocking switch device for use with an engine which is drivingly connected with a hydraulically shifted transmission having a rotary valve with a rotatable valve core and a spring biased pressure regulating piston for controlling the hydraulic system to selectively provide a drive or neutral condition and fluid pressure within the hydraulic system in the transmission, comprising an electric starting means for starting the engine, a housing rigidly mounted to the rotary valve, means for locking the valve core in neutral position, said locking means being responsive to the pressure regulating piston for unlocking the valve core when the drive engine has been started to permit rotation of the valve core to a drive position, and switch means responsive to movement of said locking means for rendering the engine starting means inoperative when the valve core is not locked in neutral position.

10. In an interlocking switch device for use with an engine which is drivingly connected with a hydraulically shifted transmission having a rotary valve with a rotatable valve core and a spring biased pressure regulating piston for controlling the hydraulic system to selectively provide a drive or neutral condition and fluid pressure within the hydraulic system in the transmission, comprising an electric starting means for starting the engine, a housing rigidly mounted to the rotary valve, a locking plate rigidly mounted to the valve core, a plunger biased to engage said locking plate for locking the valve core against rotation in neutral position, said plunger being responsive to the pressure regulating piston for unlocking the valve core when the engine is started to permit the valve core to rotate to a drive position, and a switch responsive to movement of the plunger for rendering the starting means inoperable when the valve core is unlocked.

11. In an interlocking switch device for use with an engine which is drivingly connected with a hydraulically shifted transmission having a rotary valve with a rotatable valve core and a spring biased pressure regulating piston for controlling the hydraulic system to selectively provide a drive or neutral condition, and to maintain fluid pressure within the hydraulic system in the transmission, comprising an electric starting means for starting the engine, a housing rigidly mounted to the rotary valve, a locking plate having a flat sided aperture therein keyed to the valve core to rotate therewith, a spring biased plunger slideably mounted in said housing and said locking plate in contact with the pressure regulating piston, means to hold the plunger against rotation in said housing, said plunger having flat surfaces thereon for locking the plunger to said locking plate in the aperture in said locking plate, said plunger being disengaged from said locking plate for permitting movement of the valve core to a drive position only in response to the pressure regulating piston movement within the valve core to regulate the fluid pressure subsequent to starting of the engine, a cam surface formed on said plunger within said housing, a switch rigidly mounted in said housing responsive to said cam surface on said plunger to render the engine starting means operable only when said plunger is within said interlocking plate.

12. In an interlocking switch device for use with an engine which is drivingly connected with a hydraulically shifted transmission having a rotary valve with a rotatable valve core and a spring biased pressure regulating piston for controlling the hydraulic system to selectively provide a drive or neutral condition and fluid pressure within the hydraulic system in the transmission, comprising an electric starting means for starting the engine, a housing rigidly mounted to the rotary valve, a first locking plate rigidly mounted in said housing having a flat-sided aperture therein, a second locking plate rigidly mounted in the valve core having a flat-sided surface thereon, a plunger slideably mounted in said housing having flat-sided portions thereon fitting the flat-sided apertures in the plate for interlocking the first and second locking plates with the valve core in neutral to prevent rotation of the valve core to a drive position, said plunger being responsive to the regulating piston to move said housing, and switch means responsive to movement of said plunger when moved to the unlocked position for rendering the engine starting means inoperable when the valve core is unlocked and free to rotate to select a drive position.

References Cited in the file of this patent

UNITED STATES PATENTS

| | | |
|---|---|---|
| 2,374,303 | Osborne | Apr. 24, 1945 |
| 2,659,018 | Harrison | Nov. 10, 1953 |
| 2,796,059 | Long | June 18, 1957 |
| 2,800,544 | Caparone | July 23, 1957 |
| 2,803,236 | Famburello | Aug. 20, 1957 |
| 2,818,472 | Mueller et al. | Dec. 31, 1957 |
| 2,824,459 | Thibodeau | Feb. 25, 1958 |
| 2,934,054 | Quinlan | Apr. 26, 1960 |

UNITED STATES PATENT OFFICE

CERTIFICATE OF CORRECTION

Patent No. 2,997,996                            August 29, 1961

Edward S. Russey et al.

It is hereby certified that error appears in the above numbered patent requiring correction and that the said Letters Patent should read as corrected below.

Column 6, line 74, for "25) would not be aligned" read -- flats 191 on the plunger 189 --.

Signed and sealed this 27th day of March 1962.

(SEAL)
Attest:

ERNEST W. SWIDER
Attesting Officer

DAVID L. LADD
Commissioner of Patents